United States Patent [19]

Byrd et al.

[11] Patent Number: 4,595,566
[45] Date of Patent: Jun. 17, 1986

[54] CONTINUOUS REACTOR DESIGN

[75] Inventors: Audis C. Byrd, Duncan; Robert J. Morris, Lawton; Robert H. Black; Jimmie D. Weaver, Jr., both of Duncan, all of Okla.

[73] Assignee: Halliburton Company, Duncan, Okla.

[21] Appl. No.: 615,440

[22] Filed: May 30, 1984

[51] Int. Cl.[4] ............................................. B01F 15/02
[52] U.S. Cl. .................................. 422/134; 366/267; 366/333; 422/135; 422/225
[58] Field of Search .............................. 422/133–135, 422/138, 225; 366/333, 267; 261/82, 18 R, DIG. 26; 73/198

[56] References Cited

U.S. PATENT DOCUMENTS

| | | | |
|---|---|---|---|
| 1,982,884 | 12/1934 | Schroder et al. | 261/DIG. 26 |
| 2,127,191 | 8/1938 | Thernell | 261/82 X |
| 2,673,723 | 3/1954 | Keen | 261/DIG. 26 |
| 2,885,268 | 5/1959 | Breer et al. | 422/133 |
| 2,978,441 | 4/1961 | Sherk | 422/134 X |
| 3,773,470 | 11/1973 | Rouzier | 422/134 X |
| 3,917,756 | 11/1975 | Rice | 261/18 R |
| 4,315,541 | 2/1982 | Murata et al. | 422/135 X |
| 4,363,784 | 12/1982 | Hilbig et al. | 422/135 X |
| 4,379,122 | 4/1983 | Taubenmann | 422/133 |
| 4,475,821 | 10/1984 | Koch et al. | 422/133 X |
| 4,503,014 | 3/1985 | Bauer | 422/135 |
| 4,512,187 | 4/1985 | Sigwardt | 73/198 |
| 4,512,188 | 4/1985 | Erickson | 73/198 |

Primary Examiner—Richard L. Chiesa

[57] ABSTRACT

A continuous reactor for forming polymeric materials from reactive components for use in a system for mixing monomeric materials and the process of operation of the continuous reactor and system.

10 Claims, 5 Drawing Figures

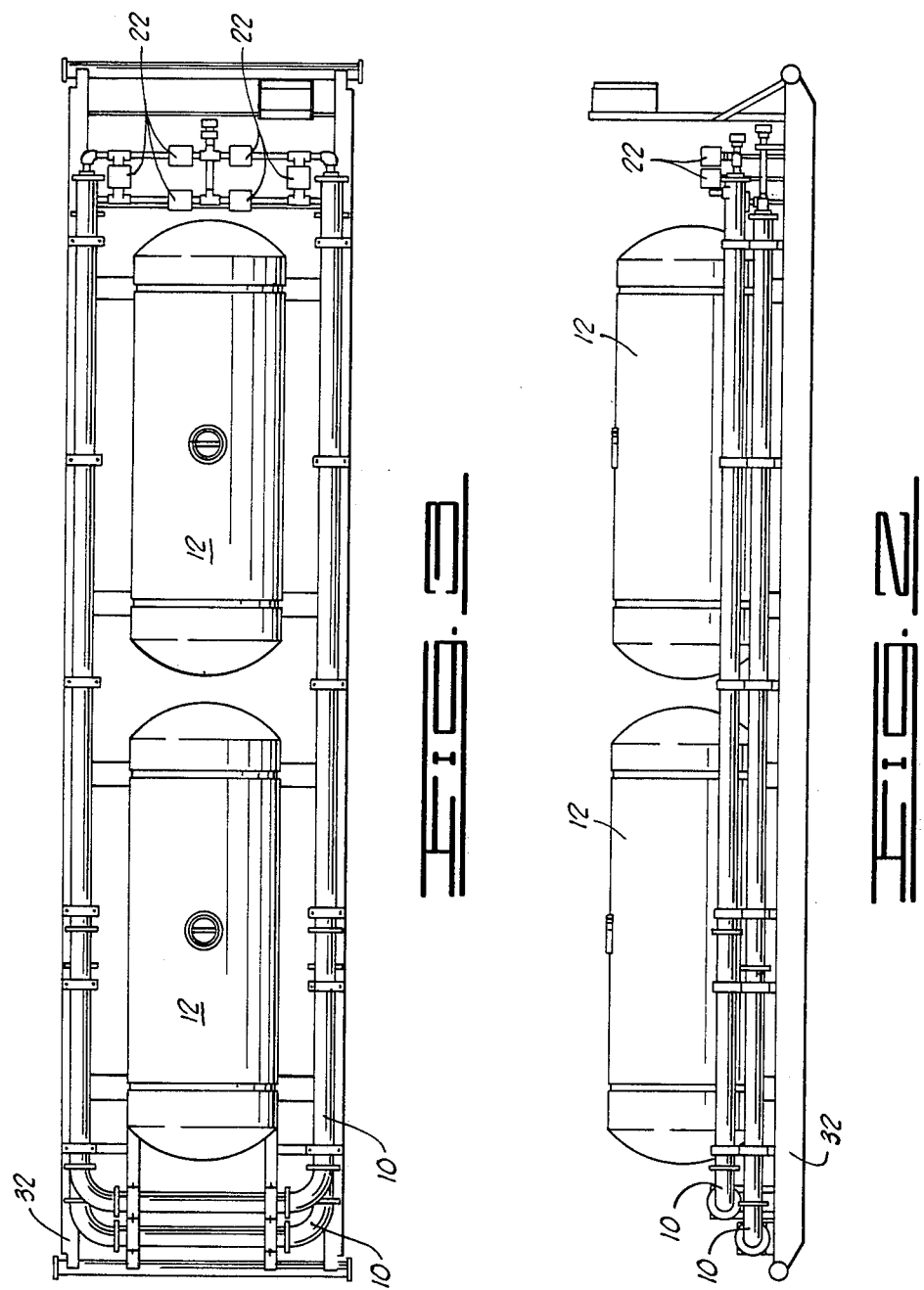

CONTINUOUS REACTOR DESIGN

BACKGROUND OF THE INVENTION

This invention relates to a continuous reactor for forming polymeric materials from reactive components for use in a system for mixing monomeric materials and the process of operation of the continuous reactor and system.

When desired, one way of mixing and reacting the reactive components to form polymeric material or other types of material is to use mechanically stirred chemical reactors. Another way is to simply mix and react the reactive components which form polymeric material by pumping them into a reaction vessel, usually a pipe or tank.

Such reactors have not proved successful as the polymeric material formed from the reactive components builds up on the reactor walls and upon the mechanical agitators greatly reducing the volume of the reactor thereby affecting the retention time of the reactive components within the chamber and the quality of polymeric material produced from the reactive components.

STATEMENT OF THE INVENTION

The present invention is directed to a continuous reactor for forming polymeric materials from reactive components for use in a system for mixing monomeric materials and the process of operation of the continuous reactor and system. The continuous reactor of the present invention comprises a reaction chamber having a translatable wiper piston therein used in a system and process for mixing monomeric materials.

BRIEF DESCRIPTION OF THE DRAWINGS

FIG. 2 is a side view of a continuous reactor of the present invention and a portion of the polymer mixing system.

FIG. 3 is a top view of the continuous reactor of the present invention shown in FIG. 2 and a portion of the polymer mixing system.

DESCRIPTION OF THE INVENTION

Figure 1:
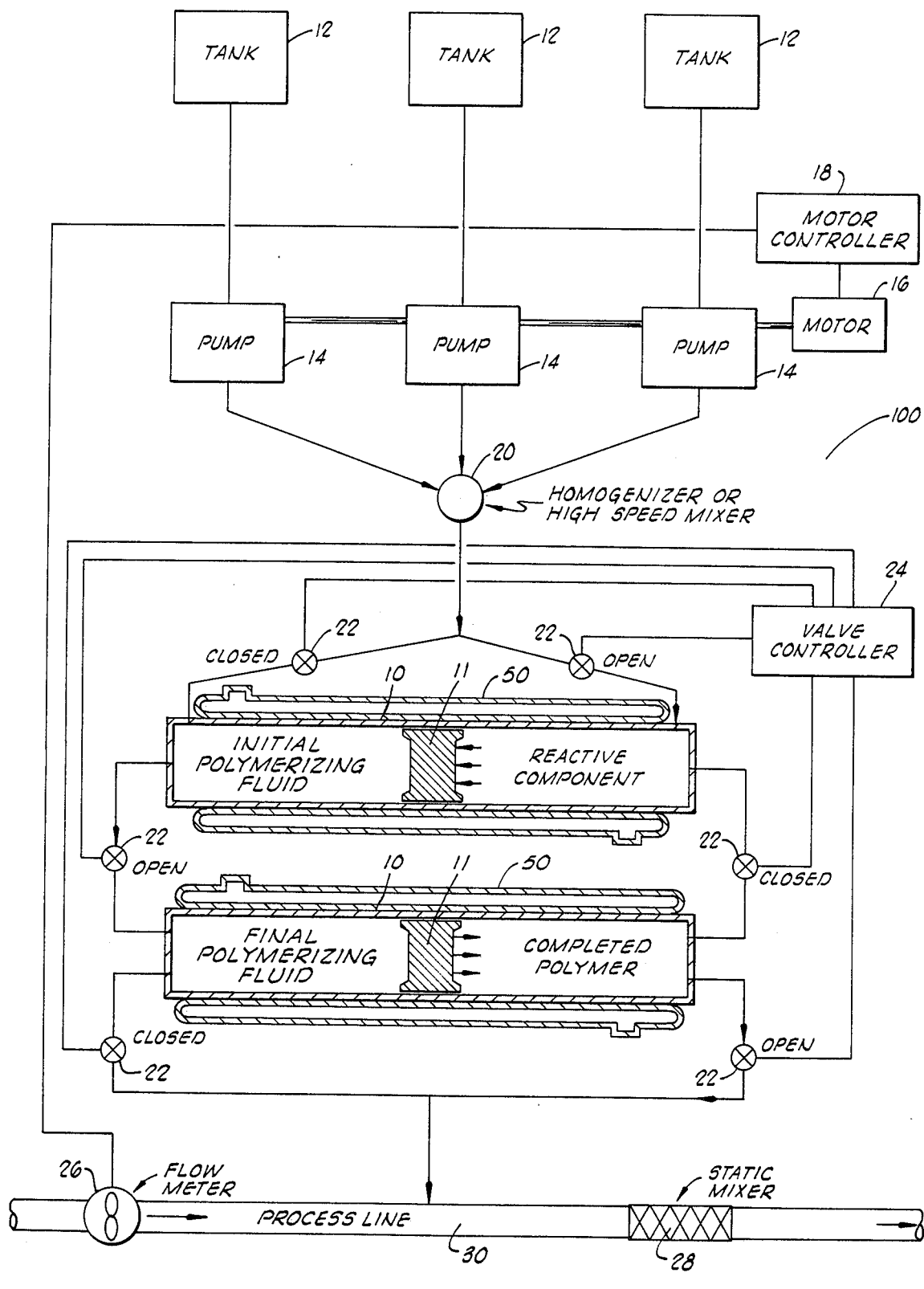
FIG. 1 is a schematic drawing of the continuous reactor of the present invention in a polymer mixing system.

Referring to FIG. 1, the continuous reactor 10 of the present invention is shown schematically in a polymer mixing system 100.

The mixing system 100 comprises a plurality of chemical tanks 12, each tank having an inlet and outlet thereto, a plurality of pumps 14 having the inlet thereof connected to the tanks 12, the pumps 14 being driven by motor 16 which is controlled via motor controller 18, a high speed mixer or homogenizer 20 connected to the output of pumps 14, a plurality of continuous reactors 10 connected to the outlet of the high speed mixer 20, the flow to and from the continuous reactors 10 being controlled by valves 22 which are, in turn, actuated by valve controller 24, a flow meter 26 which is connected to the motor controller 18 to supply a signal thereto to control the speed of the motor 16 and a static mixer 28 installed in flow line 30 to mix the polymerized fluid from the continuous reactors 10 with the fluid in flow line 30 for injection into a well.

As shown, the continuous reactors 10 are mixing chambers, each having a translatable piston 11 located therein which divides the reactor 10 into two reaction chambers of variable size as the materials are pumped into and discharged therefrom.

Each continuous reactor 10 also may include a heating and/or cooling jacket 50 therearound to control the temperature of the polymerizing fluid during the reaction process.

As shown, the continuous reactors 10 are hooked or connected in series to lengthen the residence time of the reactive components during the polymerizing process. During operation, the initial polymerizing fluid from the first continuous reactor 10 is pumped into the second continuous reactor 10 so that it under goes the final polymerizing step before as a completed polymer, being discharged into the process line. In this manner, by connecting the continuous reactors in series the residence time in the reactors 10 may be increased to any desired amount.

Referring to FIG. 2, a portion of the polymer mixing system 100 having the continuous reactors 10 therewith are shown in a side view. Each continuous reactor 10 comprises a U-shaped annular cylindrical pipe member supported on a rectangular frame 32 having the flow controlled thereto and therefrom by valves 22.

Referring to FIG. 3, the portion of the polymer mixing system 100 shown in FIG. 2 having the continuous reactors 10 therewith is shown in a top view. As shown, each continuous reactor 10 comprises a U-shaped annular cylindrical pipe member supported on a rectangular frame 32 having the flow controlled thereto and therefrom by valves 22. Although the annular cylindrical pipe member is shown as having a U-shape, it may be of any convenient shape, such as straight, L-shaped, etc. depending upon the desired configuration of the manifolding arrangement interconnecting the continuous reactors 10, pumps, process line, etc.

Figure 4:
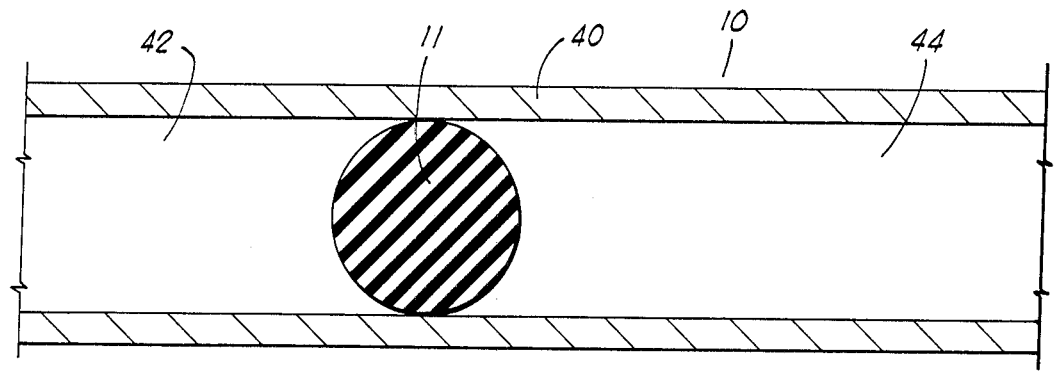
FIG. 4 is a cross-sectional view along lines 4—4 of FIG. 2 of a portion of the continuous reactor of the present invention.

Referring to FIG. 4, a portion of a continuous reactor 10 having the translatable piston 11 located therein is shown. The continuous reactor 10 comprises an annular cylindrical pipe housing 40 having a resilient translatable piston 11 in the form of a resilient spherical member, such as a rubber ball, located therein. The translatable piston 11 is pumped to and fro through the housing 40 by the polymer components being pumped into the reactor 10 to react therein to form the desired polymeric material. The piston 11 serves to separate the continuous reactor 10 into two separate compartments 42 and 44. As the translatable piston 11 is pumped to and fro through the housing 40, since the piston 11 resiliently, slidingly engages the interior of the housing 40, any of the reacted polymeric materials attempting to reside on the interior of the housing 40 will be removed therefrom by the piston 11 as it travels through the housing 40. In this manner, the interior of the housing 40 remains substantially free of reacted polymeric material.

The resilient piston 11 may be made in any convenient shape or of any suitable material, such as synthetic rubber, which is capable of being easily pumped through the interior of housing 40 and which effectively wipes or removes reacted polymeric material therefrom.

Figure 5:
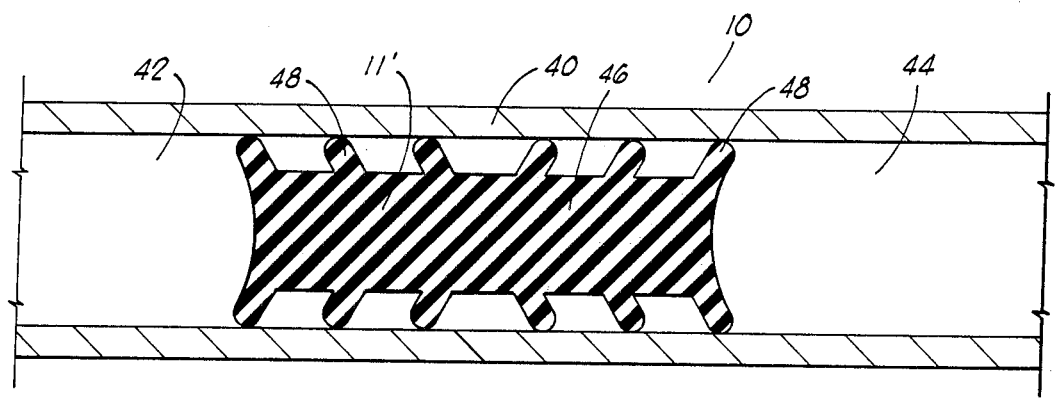
FIG. 5 is a view of an alternative embodiment of the translatable piston of the present invention.

Referring to FIG. 5, an alternative type of translatable piston 11 is shown. If desired, the translatable piston 11 may be a resilient wiper plug 46 having a plurality of resilient annular wiper members 48 thereon resiliently, slidingly engaging the interior of the housing 40 of the continuous reactor 10. By utilizing a resilient wiper plug 46 having a plurality of resilient annular wiper members 48 thereon engaging the interior of the housing 40, a better wiping action may occur than when a spherical resilient member is used as the piston 11. The resilient wiper plug 46 may be formed of any suitable resilient material, such as synthetic rubber, and contain any desired number of annular wiper members 48 thereon, although the wipers 48 must be alternately directed thereon.

OPERATION OF THE INVENTION

Referring again to FIG. 1, the present invention operates as follows. Chemicals from the tanks 12 are pumped by the pumps 14 into a high speed mixer or homogenizer 20 where they are mixed into a homogeneous mixture of reactive components. From the mixer 20 the homogeneous mixture of reactive component is pumped into an initial continuous reactor 10 connected to the mixer 20.

As the mixture of reactive components flows into the initial continuous reactor 10 from the mixer 20, the mixture causes the translatable piston 11 to move within the reactor 10 as the components flow onto one side of the piston 11. As the translatable piston 11 moves within the reactor 10 since the reactors 10 are connected in series, when valve 22 is open to allow communication between the initial reactor 10 and the subsequent reactor 10 connected thereto, the initial polymerizing fluid in the initial reactor 10 on the other side of the piston 11 flows from the initial reactor 10 into the subsequent reactor 10 on one side of the translatable piston 11 causing the translatable piston 11 therein to move therein thereby causing the completed polymer to the other side of the piston 11 in the subsequent reactor 10 to flow via open valve 22 into the process line 30.

When the translatable pistons 11 in the reactors 10 have moved completely to the ends of the reactors 10 such that the further movement of the pistons 11 are precluded within the reactors 10, the positions of the various valves 22 are reversed so that the pistons 11 in the reactors 10 are moved in the opposite directions therein by the flow of the mixture of reactive components into the initial reactor 10 causing the flow of fluids to, and from throughout, the subsequent reactor 10 when the valves 22 are positioned properly within the flow lines connecting the reactors 10 to the mixer 20 and process line 30.

The reactors 10 may be heated or cooled during their operation by use of heating and cooling jackets 50.

The rate at which the chemicals are pumped into one portion of the initial reactor 10 and initial polymerizing fluid therefrom as well as final polymerizing fluid and completed polymer from subsequent reactor 10 into the process line 30 may be varied by controlling the pumping rate of the pumps 14.

The flow rate in the process line 30 may be sensed via flow meter 26 to provide an input to motor controller 18 to vary the pumping rate of the pumps 14.

The completed polymer from subsequent reactor 10 may be mixed more thoroughly in process line 30 by use of a static mixer 28 therein.

A mixing system 100 such as the present invention and its process of operation is particularly suited where it is desired to mix and produce solution polymers in large quantities from monomeric materials.

It will be obvious to those skilled in the art that modifications, additions and deletions may be made to the present invention which modifications, additions and deletions are intended to be within and covered by the scope of the present invention.

Having thus described our invention, we claim:

1. In combination, a polymer mixing system having a source of supply of unreacted polymeric fluids, said polymer mixing system having the outlet thereof connected to a flow line supplying fluid for injection into a well and a continuous reactor for reacting said unreacted polymeric fluids therein to form a reacted polymeric fluid injection into said flow line supplying fluid for injection into said well, said continuous reactor for use in said polymer mixing system, wherein:

said polymer mixing system comprises:
  a plurality of fluid tanks to serve as said source of supply of said unreacted polymeric fluids, each tank having an inlet and an outlet; and
  a plurality of pumps, each pump having the inlet thereto connected to the outlet of one of said plurality of tanks and an outlet therefrom, said plurality of pumps for pumping said unreacted polymeric fluids from said plurality of tanks to said continuous reactor; and said continuous reactor connected to the outlets of the plurality of pumps, said continuous reactor for reacting said unreacted polymeric fluids therein to form a reacted polymeric fluid when said unreacted polymeric fluids are pumped by said plurality of pumps thereinto, said continuous reactor comprises:
  a housing; and
  a translatable piston contained within the housing slidably, sealingly engaging the interior thereof, the translatable piston dividing the housing into two mixing chambers in which said unreacted polymeric fluids are reacted to form said reacted polymeric fluid for injection into said well, the translatable piston being moved in the housing solely in response to the pumping of said unreacted polymeric fluids into said continuous reactor whereby when said unreacted polymeric fluids are pumped into one mixing chamber of the housing of said continuous reactor said unreacted polymeric fluids move the translatable piston within the housing thereby simultaneously forcing said reacted polymeric fluid from the other chamber of the housing of said continuous reactor into said flow line supplying fluid for injection into said well.

2. The combination of claim 1 wherein the continuous reactor further comprises:
an annular cylindrical housing; and
the translatable piston comprises a resilient member contained within the annular cylindrical housing slidably, sealingly engaging the interior thereof.

3. The combination of claim 2 wherein the translatable piston further comprises:
a resilient spherical member.

4. The combination of claim 2 wherein the translatable piston further comprises:
a resilient wiper plug having a plurality of resilient annular wiper members thereon resiliently, slidingly, sealingly engaging the interior of the annular cylindrical housing.

5. The combination of claim 2 wherein the continuous reactor housing further comprises:
a jacket therearound for heating and/or cooling the polymerizing fluid to control the temperature thereof during the reaction process.

6. The combination of claim 2 wherein the polymer mixing system further comprises:
motor means for driving the plurality of pumps;
a motor controller for controlling the speed of the motor means;
a plurality of valves to control the flow of fluid to and from the continuous reactor;
a valve controller to control the plurality of valves; and
a flow meter connected to the motor controller to supply a signal thereto.

7. In combination, a polymer mixing system having a source of supply of unreacted polymeric fluids, said polymer mixing system having the outlet thereof connected to a flow line and a continuous reactor for reacting said unreacted polymeric fluids therein to form a reacted polymeric fluid, said continuous reactor for use in said polymer mixing system, wherein:
said polymer mixing system comprises:
- a plurality of fluid tanks to serve as said source of supply of said unreacted polymeric fluid, each tank having an inlet and an outlet;
- a plurality of pumps, each pump having the inlet thereto connected to the outlet of one of said plurality of tanks and an outlet therefrom, said plurality of pumps for pumping said unreacted polymeric fluids from said plurality of tanks to said continuous reactor;
- a motor means for driving the plurality of pumps;
- a motor controller for controlling the speed of the motor means;
- a plurality of valves to control the flow of said unreacted polymeric fluids from the pump means;
- a valve controller to control the plurality of valves; and
- a flow meter connected to the motor controller to supply a signal thereto; and said continuous reactor connected to the outlet of the plurality of pumps, said continuous reactor for reacting said unreacted polymeric fluids therein to form a reacted polymeric fluid when said unreacted polymeric fluids are pumped by said plurality of pumps thereinto, said continuous reactor comprises:
an annular cylindrical housing; and
a resilient translatable piston contained within the annular cylindrical housing slidably, sealingly engaging the interior thereof, the resilient translatable piston dividing the annular cylindrical housing into tow mixing chambers in which said unreacted polymeric fluids are reacted to form said reacted polymeric fluid for injection into said well, the resilient translatable piston being moved in the annular housing solely in response to the pumping of unreacted polymeric fluids into said continuous reactor whereby when said unreacted polymeric fluids are pumped into one mixing chamber of the annular cylindrical housing of said continuous reactor said unreacted polymeric fluids move the resilent translatable piston within the annular cylindrical housing thereby simultaneously forcing said reacted polymeric fluid from the other chamber of the housing of said continuous reactor.

8. The combination of claim 7 wherein the resilient translatable piston further comprises:
a resilient spherical member.

9. The combination of claim 7 wherein the resilient translatable piston further comprises:
a resilient wiper plug having a plurality of resilient annular wiper members thereon resiliently, slidingly, sealingly engaging the interior of the annular cylindrical housing.

10. The combination of claim 7 wherein the polymer mixing system further comprises:
a static mixer located in the flow line supplying fluid for injection into a well; and
a high speed mixer interposed between the plurality of pumps and the continuous reactor.

* * * * *